United States Patent
Koch

(10) Patent No.: US 12,529,344 B2
(45) Date of Patent: Jan. 20, 2026

(54) METHOD FOR OPERATING A SPARK-IGNITION INTERNAL COMBUSTION ENGINE AND CONTROLLER FOR CARRYING OUT THE METHOD

(71) Applicant: KEYOU GmbH, Unterschleissheim (DE)

(72) Inventor: Daniel Koch, Munich (DE)

(73) Assignee: KEYOU GmbH, Munich (DE)

( * ) Notice: Subject to any disclaimer, the term of this patent is extended or adjusted under 35 U.S.C. 154(b) by 0 days.

(21) Appl. No.: 18/683,811

(22) PCT Filed: Aug. 16, 2022

(86) PCT No.: PCT/EP2022/072865
§ 371 (c)(1),
(2) Date: Feb. 15, 2024

(87) PCT Pub. No.: WO2023/021036
PCT Pub. Date: Feb. 23, 2023

(65) Prior Publication Data
US 2024/0328366 A1 Oct. 3, 2024

(30) Foreign Application Priority Data
Aug. 16, 2021 (DE) .................... 10 2021 121 214.6

(51) Int. Cl.
*F02D 19/00* (2006.01)
*F02D 19/02* (2006.01)
(Continued)

(52) U.S. Cl.
CPC ......... *F02D 19/024* (2013.01); *F02D 35/027* (2013.01); *F02D 41/0027* (2013.01)

(58) Field of Classification Search
CPC ...... F02D 19/024; F02D 19/12; F02D 35/027; F02D 35/0085; F02D 35/005; F02M 26/00; F02M 21/0206; Y02T 10/30
See application file for complete search history.

(56) References Cited

U.S. PATENT DOCUMENTS 3,817,221 A * 6/1974 Nohira .................... F02M 25/00
 123/25 Q
5,381,771 A * 1/1995 Leshner .................. F02D 43/00
 123/585
(Continued)

FOREIGN PATENT DOCUMENTS

CN 102257261 A 11/2011
CN 107709956 A 2/2018
(Continued)

*Primary Examiner* — Phutthiwat Wongwian
*Assistant Examiner* — Sherman D Manley
(74) *Attorney, Agent, or Firm* — The Webb Law Firm

(57) ABSTRACT

A method for operating a spark-ignition internal combustion engine, wherein the internal combustion engine is operated using hydrogen as fuel, a lambda injection value is a value that indicates the formation of a mixture on the basis of an injection fuel quantity ($F_{injection}$) to be supplied to a combustion chamber of the internal combustion engine and an air quantity (L) to be supplied to the combustion chamber from outside of the internal combustion engine, wherein the injection fuel quantity ($F_{injection}$) is determined, at least in some ranges, independently of a lambda target value. In order to ensure adequate operation of hydrogen engines, the injection fuel quantity ($F_{injection}$) is determined, at least in some ranges, at least on the basis of the air quantity (L).

11 Claims, 3 Drawing Sheets

(51) Int. Cl.
*F02D 35/02* (2006.01)
*F02D 41/00* (2006.01)

(56) References Cited

U.S. PATENT DOCUMENTS

| | | | | |
|---|---|---|---|---|
| 6,637,382 | B1* | 10/2003 | Brehob | F02D 23/02 |
| | | | | 123/25 J |
| 7,421,330 | B2 | 9/2008 | Saikkonen et al. | |
| 9,175,599 | B2* | 11/2015 | Pursifull | F02D 19/0615 |
| 9,506,411 | B2 | 11/2016 | Glugla et al. | |
| 11,268,460 | B2 | 3/2022 | Prumm | |
| 11,649,778 | B2* | 5/2023 | Prümm | F02D 41/0027 |
| | | | | 123/406.26 |
| 2007/0039598 | A1* | 2/2007 | Wakayama | F02D 41/005 |
| | | | | 123/568.21 |
| 2007/0150165 | A1 | 6/2007 | Saikkonen et al. | |
| 2011/0301826 | A1 | 12/2011 | Galindo et al. | |
| 2015/0059686 | A1 | 3/2015 | Glugla et al. | |
| 2018/0100449 | A1* | 4/2018 | Welch | F02D 19/027 |
| 2019/0063355 | A1* | 2/2019 | Hayashita | G01M 15/104 |
| 2019/0376463 | A1* | 12/2019 | Sixel | F02D 37/02 |
| 2021/0062738 | A1* | 3/2021 | Ruhland | F02D 41/10 |
| 2021/0155895 | A1 | 5/2021 | Nasonkin et al. | |
| 2021/0332743 | A1* | 10/2021 | Seba | F02B 19/12 |
| 2022/0049668 | A1* | 2/2022 | Prümm | F02D 41/0027 |
| 2022/0112835 | A1* | 4/2022 | Bunce | F02M 21/0278 |
| 2022/0163005 | A1* | 5/2022 | Pedder | F02D 35/027 |
| 2023/0081177 | A1* | 3/2023 | Høffner | F02M 21/0206 |
| | | | | 60/274 |
| 2023/0088765 | A1* | 3/2023 | Honda | F02D 19/10 |
| 2023/0265780 | A1* | 8/2023 | Fimml | F02B 19/18 |
| | | | | 123/256 |

FOREIGN PATENT DOCUMENTS

| | | |
|---|---|---|
| CN | 112912603 A | 6/2021 |
| DE | 102014217373 A1 | 3/2015 |
| DE | 102015117148 A1 | 4/2016 |
| DE | 102017120512 A1 | 3/2019 |
| DE | 102018122963 A1 | 3/2020 |
| DE | 102019213132 A1 | 3/2021 |
| DE | 102020006983 A1 | 3/2021 |
| EP | 1754874 A1 | 2/2007 |
| EP | 3578786 A1 | 12/2019 |
| JP | 200751587 A | 3/2007 |
| JP | 2013528260 | 7/2013 |
| JP | 2016217262 A | 12/2016 |
| WO | 2021155895 A1 | 8/2021 |

* cited by examiner

METHOD FOR OPERATING A SPARK-IGNITION INTERNAL COMBUSTION ENGINE AND CONTROLLER FOR CARRYING OUT THE METHOD

CROSS-REFERENCE TO RELATED APPLICATIONS

This application is the United States national phase of International Application No. PCT/EP2022/072865 filed Aug. 16, 2022, and claims priority to German Patent Application No. 10 2021 121 214.6 filed Aug. 16, 2021, the disclosures of each of which are hereby incorporated by reference in their entireties.

BACKGROUND OF THE INVENTION

Field of the Invention

The present invention relates to a method for operating a spark-ignition internal combustion engine as well as to a controller for carrying out the method.

In spark-ignited gasoline engines, it is known to determine a fuel quantity to be supplied to the combustion chamber on the basis of a controlled air quantity. In particular, if the performance of the gasoline engine is to be increased, a flow cross section is increased by way of a throttle valve. The fuel quantity is then determined in dependency of the air quantity flowing through the flow cross section so that a constant, typically stoichiometric air/fuel mixture (lambda=1) arises.

If such a gasoline engine is operated using hydrogen as fuel, the previously described control of the fuel quantity is not adequate. Because the combustion behavior of hydrogen differs significantly from that of fuels commonly used in gasoline engines, such as gasoline.

Description of Related Art

EP 1 754 874 A1 and DE 10 2019 213 132 A1 show a method for operating a spark-ignition internal combustion engine, wherein the exhaust gas recirculation quantity is increased to combust a richer mixture.

U.S. Pat. No. 7,421,330 B2 shows a method in which an internal combustion engine comprises several combustion chambers and knock monitoring is carried out for the specific combustion chamber.

WO 2021/005344 A1 shows a hydrogen-operated spark-ignition internal combustion engine. The engine performance is controlled solely by the fuel quantity. However, with such a fuel-only control, combustion anomalies that have a negative impact on engine behavior can occur.

SUMMARY OF THE INVENTION

It is therefore the object of the present invention to provide a method for determining the fuel quantity that meets the needs of a hydrogen-operated internal combustion engine.

The object according to the invention is satisfied by a method as described herein.

According to a first independent aspect, a method for operating a spark-ignition internal combustion engine is provided, where the internal combustion engine is operated using hydrogen as fuel, a lambda injection value is a value that indicates the formation of a mixture on the basis of an injection fuel quantity to be supplied to a combustion chamber of the internal combustion engine and an air quantity to be supplied to the combustion chamber from outside of the internal combustion engine, where the injection fuel quantity is determined, at least in some ranges, independently of a lambda target value, is determined preferably at least on the basis of a default fuel quantity, particularly preferably equal to the default fuel quantity. In addition, the injection fuel quantity is determined, at least in some ranges, on the basis of the air quantity.

According to the first aspect, the fuel quantity can be the control variable. More precisely, the injection fuel quantity to be injected is determined, at least in some ranges, independently of a predetermined lambda target value. Therefore, for example, in the event of fluctuations in the air quantity supplied to the engine, the fuel quantity can be freely determined on the basis of a default fuel quantity, without there being tied to the air quantity supplied, as is the case with conventional gasoline methods. Determining the fuel quantity therefore follows the diesel method. The injection fuel quantity is determined and injected, at least in some ranges, independently of a fixed lambda target value. The internal combustion engine is operated, at least in some ranges, in accordance with a quality control system. The flexibility of the internal combustion engine can thus be increased. However, if the air quantity is not taken into account, there is a risk that the internal combustion engine will be operated with combustion mixtures that cause combustion anomalies such as knocking. Therefore, according to the present invention, the injection fuel quantity is determined, at least in some ranges, on the basis of the air quantity. This allows the lambda injection value to be limited, for example, to prevent knocking.

The air quantity is preferably measured and/or obtained by modeling. This makes it possible to draw conclusions about the air quantity supplied to the combustion chamber.

The injection fuel quantity is preferably determined, at least in some ranges, to be equal to the default fuel quantity. This means that the desired default fuel quantity can be set and injected independently of the air quantity supplied.

According to the invention, the injection fuel quantity is determined, at least in some ranges, on the basis of a lambda target range such that the lambda injection value is within the lambda target range of lambda target values that is limited at least on one side by a first lambda target limit value.

In certain ranges, limiting the hydrogen/air mixture (lambda injection value) can be necessary to suppress the occurrence of combustion anomalies. The fuel quantity can be determined such that, when taking into account the air quantity to be supplied to the internal combustion engine, a hydrogen/air mixture results that lies within a range in which combustion anomalies do not occur. This range comprises a plurality of possible lambda target values and is limited at least on one side by a lambda target limit value. According to this aspect, the air quantity is therefore taken into account when determining the fuel quantity.

The first lambda target limit value is preferably a lower limit value of the range of lambda target values, is preferably greater than or equal to 1.2 and less than or equal to 2.5, particularly preferably greater than or equal to 1.2 and less than or equal to 1.8, again preferably it corresponds to 1.2.

This can ensure that a hydrogen/air mixture that is too rich is not provided for combustion. The hydrogen-powered internal combustion engine is preferably operated in the lean range (lambda>1). For example, depending on the performance range, the limit value can be gathered from the value ranges previously mentioned. The lambda target limit value is therefore preferably variable across the performance ranges.

According to yet another aspect, the injection fuel quantity can be determined such that the lambda injection value corresponds to the target lambda limit value, preferably when a lambda default value, which indicates the formation of a mixture on the basis of the default fuel quantity and the air quantity, is outside the lambda target range.

This allows the fuel quantity to be adjusted up to the limits of a permissible combustion mixture. The fuel quantity is therefore determined such that an adequate permissible combustion mixture arises from the air quantity to be supplied. In particular, a relatively small correction of the default fuel quantity can result, since the lambda target limit value is the next value of the lambda target range with respect to the lambda default value.

According to yet another aspect, the lambda target range, in particular the first lambda target limit value, can be variable.

According to this aspect, the flexibility of the internal combustion engine is increased. Depending on the boundary conditions, the limitation can be stronger or weaker.

According to yet another aspect, the internal combustion engine can further comprise an exhaust gas recirculation device which recirculates exhaust gas into the combustion chamber, at least in some ranges.

By providing exhaust gas recirculation, combustion in the combustion chamber can be stabilized. For example, knocking of the internal combustion engine due to misfiring can be prevented. In particular in the case of lean combustion, the recirculated exhaust gas contains a significant proportion of unburned oxygen (residual gas), which helps to stabilize the combustion. The recirculated exhaust gas is preferably inert with regard to combustion.

Alternatively or additionally, the internal combustion engine can comprise an inert medium supply device which is configured to supply an inert medium that does not participate in the combustion, preferably water, into the combustion chamber.

By supplying the inert medium, the combustion can also be stabilized by lowering the combustion temperature. In particular, the inert medium can be liquid or gaseous water. It is particularly inert when combusting hydrogen and can therefore lower the temperature. Furthermore, additional emissions can be prevented.

According to the invention, the injection fuel quantity is determined, at least in some ranges, on the basis of an exhaust gas recirculation quantity and/or an inert medium supply quantity.

The combustion behavior influenced by the exhaust gas recirculation quantity and/or inert medium supply quantity can therefore be taken into account when determining the injection fuel quantity.

According to the invention, the lambda target range, in particular the first lambda target limit value, is dependent upon the exhaust gas recirculation quantity and/or inert medium supply quantity, preferably the first lambda target range can be reduced with increasing demanded exhaust gas recirculation quantity and/or inert medium supply quantity.

The exhaust gas recirculation quantity and/or inert medium supply quantity can influence combustion. Therefore, the limitation can be performed by the lambda target range in dependence of the exhaust gas recirculation quantity and/or inert medium supply quantity. Since the exhaust gas recirculation as well as the inert medium supply stabilize combustion, the range of permissible lambda target values can be increased. This can be achieved in particular by reducing the first lambda target limit value as the lower limit value.

According to yet another aspect, an exhaust gas recirculation quantity and/or inert medium supply quantity can be demanded when a lambda default value, which indicates the formation of a mixture on the basis of the default fuel quantity and the air quantity, is outside the lambda target range and/or above a limit value of a performance demand.

By stabilizing combustion by way of the exhaust gas recirculation quantity and/or the inert medium supply quantity, the lambda target range can be increased precisely when the lambda default value is outside the lambda target range without exhaust gas recirculation or inert medium supply. As performance demand increases, need for fuel increases, which is why the lambda default value can go outside the permissible range. Therefore, an exhaust gas recirculation quantity and/or inert medium supply quantity can also be demanded above a limit value of the performance demand. In the case of transient increases in the load of the internal combustion engine, such as acceleration processes in a motor vehicle, the necessary performance can be provided by demanding an exhaust gas recirculation quantity and/or an inert medium supply quantity. Because without the exhaust gas recirculation quantity and/or inert medium supply quantity, the lambda target range would be more limited and the necessary performance could not be provided. An exhaust gas recirculation quantity and/or inert medium supply quantity is demanded, preferably at least in the full load range.

Alternatively or additionally, if the lambda default value is outside the lambda target range, i.e. when reaching or falling below/exceeding a limit value, in particular falling below the lower limit value, and/or above a limit value of a performance demand, the demanded exhaust gas recirculation quantity and/or or inert medium supply quantity can be increased.

The first lambda target limit value can therefore be reduced accordingly and the lambda default value can be set. This allows for appropriate control and demand-based admixture of the exhaust gas recirculation quantity.

According to yet another aspect, the demanded exhaust gas recirculation quantity and/or inert medium supply quantity can be increased as the performance demand for the internal combustion engine increases.

This allows for a richer mixture, i.e., a lower lambda injection value, to be set, as is desired with higher performance demands, since the exhaust gas recirculation and/or the inert medium supply stabilizes combustion, and thus knocking of the internal combustion engine can be prevented even at low lambda injection values. The increase in the exhaust gas recirculation quantity and/or inert medium supply quantity can therefore be used to increase performance. This is particularly advantageous for transient processes. According to yet another aspect, the default fuel quantity can be determined at least on the basis of a performance demand for the internal combustion engine.

The performance demand can therefore serve as the basis for determining the default fuel quantity and therefore also the injection fuel quantity.

Preferably, the default fuel quantity is increased as the performance demand increases, and vice versa. The calorific value of the hydrogen/air mixture correlates with the proportion of fuel in the mixture. Therefore, higher performance can be achieved by increasing the fuel quantity.

According to yet another aspect, the injection fuel quantity can be determined, at least in some ranges, on the basis of a knock signal value.

According to this aspect, a knock signal value, and hence a value indicative of combustion anomalies, can be taken into account in determining the fuel quantity. Information about the tendency of a relevant cylinder of the internal combustion engine to knock can be obtained on the basis of the knock signal value, for example, from a preceding combustion cycle. The tendency to knock depends on factors such as temperatures of the combustion chamber wall, the compression, and the manufacturing tolerances. These factors can be used in determining the injection fuel quantity for the current cycle by the knock signal value. The knock signal value can also provide information about the composition of the recirculated exhaust gas. For example, a knock signal value indicating stronger knocking can provide information about a low oxygen content in the exhaust gas, which makes it more difficult to stabilize combustion.

The first lambda target limit value is preferably increased as the knock signal value increases.

This can alleviate knocking in the internal combustion engine. Because, by increasing the lambda target limit value, the mixture can be made leaner, which reduces the tendency to knock.

According to yet another aspect of the invention, a method for operating a spark-ignition internal combustion engine is provided, where the internal combustion engine is operated using hydrogen as fuel and the internal combustion engine comprises a plurality of combustion chambers, where a) on the basis of a knock signal value associated with at least one combustion chamber, both an injection fuel quantity of the at least one combustion chamber as well as an injection fuel quantity of at least one other combustion chamber is determined, the injection fuel quantity of the one combustion chamber is determined such that the knock signal value of the one combustion chamber decreases, the one combustion chamber is operated with a leaner hydrogen/air mixture, and the injection fuel quantity is determined at the at least one other of the plurality of combustion chambers such that an overall default fuel quantity, which is a predetermined quantity of fuel supplied to all combustion chambers, is approximated as closely as possible, again preferably is achieved.

Since quality control is performed, at least in some ranges, in each of the combustion chambers, according to this aspect of the invention the fuel quantity at the at least one other cylinder can be adapted on the basis of a knock signal value of the at least one combustion chamber. In particular, the adjustment of the fuel quantity at the at least one combustion chamber can be compensated for at individual combustion chambers. The knock signal value of the at least one combustion chamber is preferably higher than that of the at least one other combustion chamber. This aspect can be provided as a second independent aspect, which can be collectively defined as redistribution of the fuel quantity, or can be provided in combination with the preceding aspects of the first independent aspect. This aspect likewise reduces the occurrence of combustion anomalies and a method is therefore provided in which the needs of hydrogen-operated internal combustion engines are taken into account.

The overall default fuel quantity can be a fuel quantity that is determined on the basis of a performance demand. For example, if a certain performance is to be achieved, this performance can be achieved or at least approximated despite the knocking in the combustion chambers of certain cylinders by adapting the fuel quantity at other cylinders accordingly.

In a), a change quantity compared to a default fuel quantity of the at least one combustion chamber is preferably added at least in part, preferably entirely, to the fuel quantity of at least one other combustion chamber with an associated lower knock signal value, particularly preferably added respectively to the fuel quantity of a plurality of other combustion chambers. According to yet another aspect, the change quantity can be added to the fuel quantity of the respective combustion chambers in dependence of the respective knock signal values of the other combustion chambers.

The fuel quantity can then be reduced at the at least one combustion chamber, for example, by increasing the lower lambda target limit value, and the fuel quantity can preferably be increased at the at least one other combustion chamber by the reduction quantity, where the overall performance output of the internal combustion engine can be maintained.

In the second independent aspect, in addition to a), at least one of:
b) increasing the exhaust gas recirculation quantity at the at least one combustion chamber;
c) shifting the ignition timing at the at least one combustion chamber to a later point in time; and
d) reducing the performance demand for the internal combustion engine can be carried out.

As already stated with regard to the first independent aspect mentioned above, combustion can be stabilized by b). The increase in the exhaust gas recirculation quantity takes place at least at the one combustion chamber with which a critical (highest) knock signal value is associated, for example, by way of a valve or a throttle in the supply channel to the respective combustion chamber. However, this advantageously takes place globally for each of the plurality of combustion chambers, where a valve or a throttle does not need to be provided in each supply channel but the control can be effected by way of a central valve. This simplifies the system and ensures combustion stabilization in all cylinders or combustion chambers, respectively. For this reason, the fuel quantity can therefore be increased in the at least one other combustion chamber. A change quantity at the at least one combustion chamber can therefore be better absorbed at the at least one other combustion chamber.

Knocking at least at the one combustion chamber can be reduced by c), since the retarded position of the ignition prevents premature uncontrolled combustion. In particular, the spark plug can be activated at a later point in time. Shifting the ignition timing to a later point in time is, for example, related to a piston position of the piston defining the combustion chamber or a crank angle and is meant to be relative to a reference value of the ignition point. The reference value can be, for example, the ignition point from the preceding cycle, or another reference value that is associated with the combustion lambda of the one combustion chamber, preferably an optimal ignition point for the respective lambda. In particular, the mixture can be ignited at a point in time when the piston is closer to the top dead center than at the reference point in time.

A default fuel quantity at the at least one combustion chamber with the critical knock signal value can be reduced by d), whereby the mixture can be leaned out and the tendency to knock can thereby be reduced.

Steps b), c) and d) are preferably carried out in the sequence stated above, for example, if it is determined that a limit value of the knock signal value is still exceeded. If, for example, it is determined that despite the redistribution according to a), a knock signal value that is too high continues to occur at the one combustion chamber, b) can be carried out. The same applies to steps c) and d). This means engine-friendly steps such as the redistribution and exhaust gas recirculation can be carried out first.

It is furthermore preferred that a verification is carried out at least in the second independent aspect as to whether a redistribution of the fuel quantity is possible, for example, whether a knock signal value at at least one of the combustion chambers is below a limit value of the knock signal value, in which case fuel can then be redistributed from the at least one combustion chamber to the combustion chamber with the low knock signal value. If so, fuel redistribution can be performed, otherwise one of steps b), c) and d) can be performed.

According to yet another aspect, the injection fuel quantity can be determined, at least in some ranges, on the basis of a lambda sensor measurement in an exhaust section of the internal combustion engine.

This allows the residual gas content in the exhaust gas to be determined, which can provide information about the mixture ratio from the preceding combustion cycle. In the case of a demanded exhaust gas recirculation, this information can be doubly relevant. Because it also provides information about the residual gas content of the exhaust gas which is fed back into the combustion chamber via the exhaust gas recirculation. The lambda target limit value can therefore likewise be determined on the basis of the lambda sensor measurement.

According to a further aspect, a controller is provided which is configured to carry out a method according to one of the preceding aspects of the invention.

The methods according to the above aspects can then be carried out if the controller is installed, for example, in a motor vehicle with a hydrogen combustion engine.

According to a further aspect of the present invention, a program is provided which, when executed on a computer coupled to an internal combustion engine, causes the computer to perform a method in accordance with the above aspects of the invention.

According to yet another aspect of the present invention, a computer-readable storage medium is provided on which the program described above is stored.

BRIEF DESCRIPTION OF THE DRAWINGS

The invention shall be described hereafter with reference to the accompanying drawings.

The terms Fig., Figs., Figure, and Figures are used interchangeably in the specification to refer to the corresponding figures in the drawings.

FIG. 3a illustrates schematically an external formation of a mixture in a hydrogen-powered internal combustion engine, whereas

Figure 1:
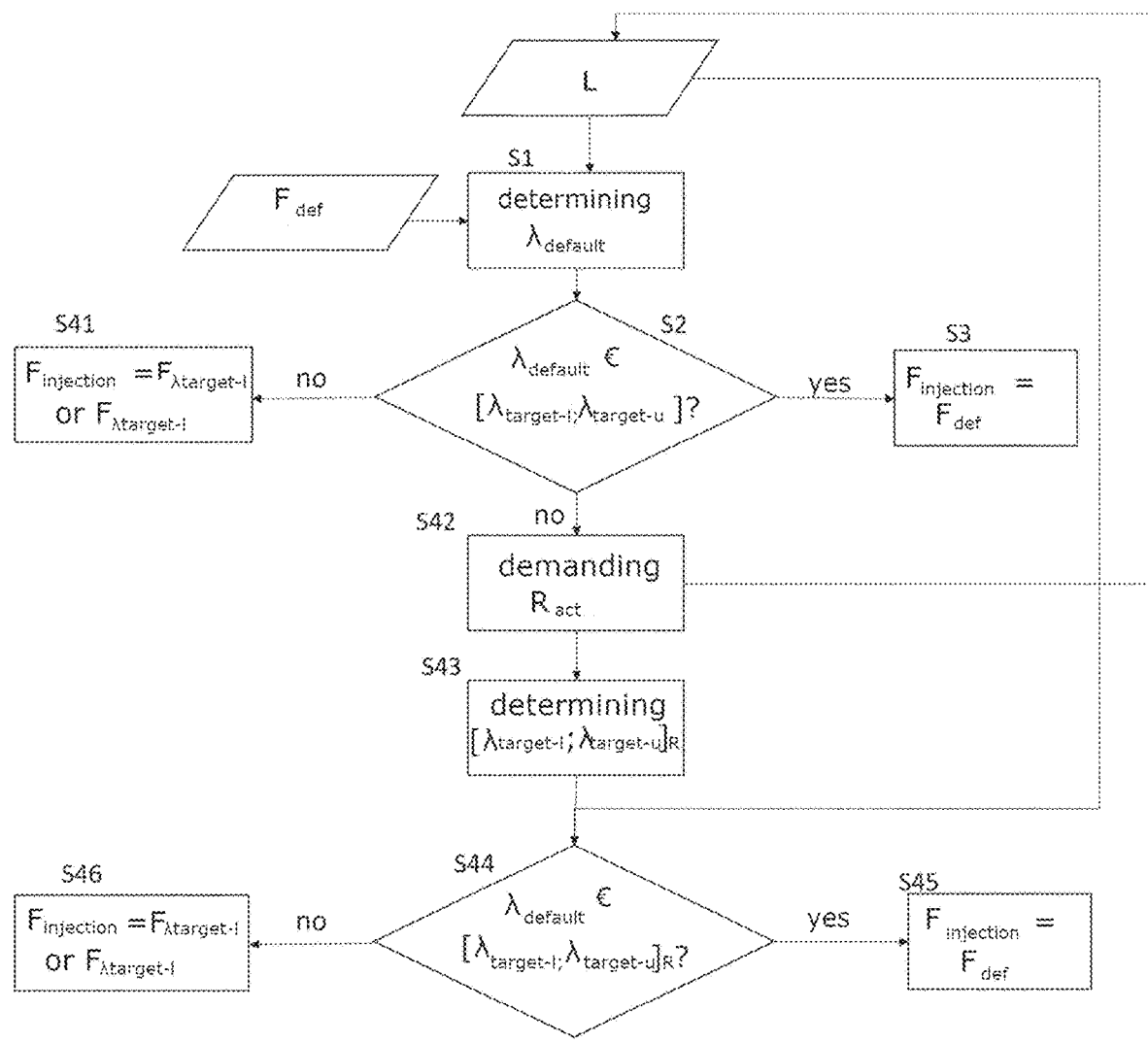
FIG. 1 shows a flow chart which illustrates the method according to the invention.

The flow chart shown in FIG. 1 illustrates a method that can be used, for example, to control a quantity of fuel in a hydrogen-powered internal combustion engine. In particular, the quantity of hydrogen for the next combustion cycle to be metered into the respective combustion chamber by way of an injector can be determined. The internal combustion engine comprises a spark plug in its cylinder head for each combustion chamber. For the purposes of the present invention, these are spark-ignition internal combustion engines. The internal combustion engine comprises at least one combustion chamber which can be defined by a cylinder, a cylinder head, and a piston coupled to a crankshaft. The method serves to control the fuel of a combustion cycle with respect to this combustion chamber, where a hydrogen/air mixture is combusted in the combustion chamber.

DESCRIPTION OF THE INVENTION

According to the method, a default fuel quantity $F_{def}$ is first specified, preferably in accordance with a load demand. The default fuel quantity $F_{def}$ is there geared towards the calorific value of the fuel. Likewise, the quantity of ambient air L measured, for example, by way of an air mass sensor and flowing into the combustion chamber from outside the internal combustion engine can be determined. From these two values, the lambda default value $\lambda_{default}$ resulting from the default fuel quantity $F_{def}$ and the ambient air L can then be calculated in a step S1.

Thereafter, it can then be verified in a step S2 whether the lambda default value $\lambda_{default}$ is within a lambda target range $[\lambda_{target-l}; \lambda_{target-u}]$ with the lower limit value $\lambda_{target-l}$ and the upper limit value $\lambda_{target-u}$. If this is the case, the injection fuel quantity $F_{injection}$ is set equal to the default fuel quantity $F_{def}$ in a step S3.

If in step S2 the lambda default value $\lambda_{air-default}$ is outside the lambda target range $[\lambda_{target-l}; \lambda_{target-u}]$, the injection fuel quantity $F_{injection}$ can be set in a step S41 equal to the limit value $\lambda_{target-l}$ or $\lambda_{target-u}$ which is closer to the lambda default lambda $\lambda$default. The injection fuel quantity $F_{injection}$ is therefore corrected in the case of step S41. The lambda target range $[\lambda_{target-l}; \lambda_{target-u}]$ can be determined in advance for the specific internal combustion engine. According to the invention, the lambda target range $[\lambda_{target-l}; \lambda_{target-u}]$ in step S2 is a lambda target range, where no exhaust gas recirculation quantity is recircled to the combustion chamber. In these cases, the lower limit value $\lambda_{target-l}$ is preferably greater than or equal to 2.0 and less than or equal to 4.5, more preferably greater than or equal to 2.0 and less than or equal to 4, and is particularly preferably between 2.2-3.8.

If in step S2 the lambda default value $\lambda$air-default is outside the lambda target range $[\lambda_{target-l}; \lambda_{target-u}]$ without exhaust gas recirculation, an exhaust gas recirculation quantity can alternatively be demanded in a step S42 if the internal combustion engine additionally comprises an exhaust gas recirculation device. The exhaust gas recirculation quantity $R_{act}$ actually supplied to the combustion chamber from the demand can also be determined or modeled, for example, by an air mass sensor. Preferably, at least one of the air quantity and the exhaust gas recirculation quantity is detected on the basis of an interaction between the air quantity and the exhaust gas recirculation quantity. For example, the exhaust gas recirculation quantity $R_{act}$ can be obtained from the difference between a combustion chamber filling quantity and the air quantity. Instead of or in addition to the exhaust gas recirculation device, an inert medium supply device can also be provided in the internal combustion engine. The inert medium supply device can supply an inert medium, such as water, directly or indirectly into the combustion chamber. The inert medium does not participate in the combustion and preferably has a specific heat capacity of at least 900 J/(kg*K), preferably of at least 1500 J/(kg*K), even more preferably of at least 4000 J/(kg*K).

The exhaust gas recirculation and the inert medium supply ensure that combustion in the combustion chamber of the internal combustion engine is stabilized. For example, knocking of the internal combustion engine due to misfiring can be at least reduced or even prevented entirely.

A different lambda target range $[\lambda_{target-l}; \lambda_{target-u}]_R$ which takes into account the exhaust gas recirculation quantity $R_{act}$ can be determined on the basis of the demanded exhaust gas recirculation quantity $R_{act}$. In this lambda target range $[\lambda_{target-l}; \lambda_{target-u}]_R$, in particular the lower limit value $\lambda_{target-l}$ is reduced compared to the one from step S2. This means that richer hydrogen/air mixtures can be combusted without combustion anomalies. The lambda target range $[\lambda_{target-l}; \lambda_{target-u}]_R$ depends on the available exhaust gas recirculation quantity. With high exhaust gas recirculation quantities, the lower lambda limit value can preferably be lowered to a value of 1.2.

In step S44, a comparison similar to that in step S2 is performed again. It is verified in particular whether the lambda default value λdefault is within a lambda target range $[\lambda_{target-l}; \lambda_{target-u}]_R$ taking into account the exhaust gas recirculation quantity $R_{act}$ with the lower limit value $\lambda_{target-l}$ and the upper limit value $\lambda_{target-u}$. If this is the case, then the injection fuel quantity $F_{injection}$ is set equal to the default fuel quantity $F_{def}$ in a step S45.

Otherwise, the injection fuel quantity $F_{injection}$ is set in a step S46 equal to the limit value $\lambda_{target-l}$ or $\lambda_{target-u}$ of the lambda target range, which is closer to the lambda default value $\lambda_{default}$, while taking into account the exhaust gas recirculation quantity $R_{act}$. The injection fuel quantity $F_{injection}$ is therefore corrected in the case of step S46.

It is to be noted that, alternatively, if it is determined that the lambda default value $\lambda_{default}$ is outside the lambda target range, i.e. a limit value, in particular the lower limit value $\lambda_{target-l}$, is exceeded or undershot, then the exhaust gas recirculation quantity can be increased. This can happen in step S42, in which case the increase is associated with an initial demand. However, this can also happen after step S44 if the present exhaust gas recirculation quantity is not sufficient.

Likewise, an exhaust gas recirculation quantity can already be present in step S2 and an increase in the exhaust gas recirculation quantity can then be demanded in step S42.

Advantageous effects of the invention shall now be described.

According to the method illustrated with reference to FIG. 1, the fuel quantity can be the control variable. More precisely, the injection fuel quantity to be injected is determined, at least in some ranges, independently of a predetermined lambda target value. In particular, the injection fuel quantity can be determined within the lambda target range $[\lambda_{target-l}; \lambda_{target-u}]$ independently of a predetermined lambda target value. For example, in the event of fluctuations in the air quantity supplied to the engine, the fuel quantity can then be freely determined on the basis of the default fuel quantity $F_{def}$ without being tied to the air quantity supplied, as is the case with conventional gasoline methods. The injection fuel quantity is determined, at least in some ranges, in the above embodiment in the lambda target range $[\lambda_{target-l}; \lambda_{target-u}]$ independently of a fixed lambda target value. The flexibility of the internal combustion engine can thus be increased. In addition, the air quantity L is determined for determining the lambda default value $\lambda_{default}$ or the lambda injection value, respectively. The injection fuel quantity is then determined on the basis of the air quantity. Preferably, as presently, the fuel quantity is determined on the basis of the air quantity and the lambda target range.

The injection fuel quantity is determined to be equal to the default fuel quantity $F_{def}$ at least in the lambda target range. This means that the desired default fuel quantity can be set and injected regardless of a certain lambda target value. The term "lambda target range" can comprise a plurality of lambda target ranges, as in the above explanation, the lambda target range $[\lambda_{target-l}; \lambda_{target-u}]$ without exhaust gas recirculation and the lambda target range $[\lambda_{target-l}; \lambda_{target-u}]_R$ with exhaust gas recirculation.

The injection fuel quantity $F_{injection}$ is determined in steps S41 and S46 such that the lambda injection value lies within a lambda target range of lambda target values that is limited at least on one side by a first lambda target limit value $\lambda_{target-l}$. The injection fuel quantity is determined in steps S41 and S46 such that an increment ΔF is added to the default fuel quantity $F_{def}$. If the lower limit value $\lambda_{target-l}$ is undershot, then this increment is negative so that the lambda injection value increases by reducing the fuel quantity. In the opposite case, where the upper limit value would be exceeded, the increment would be positive. It is to be noted that the air quantity in the present case is fixed, i.e., is not controlled, but is an actual air quantity L determined by measurement in the intake section, and the lambda injection value is therefore set by controlling the fuel quantity.

The increment ΔF and therefore the injection fuel quantity can be determined such that the lambda injection value corresponds to the lambda target limit value. This allows the fuel quantity to be adjusted up to the limits of a permissible combustion mixture. The fuel quantity is therefore determined such that an adequate permissible combustion mixture arises from the actual air quantity to be supplied. In particular, a relatively small correction to the default fuel quantity can result, since the lambda target limit value is the next value from the lambda target range with respect to the lambda default value.

In the above embodiment, a lower limit value of the range of lambda target values is dependent upon an exhaust gas recirculation quantity, is preferably greater than or equal to 1.2 and less than or equal to 2.5, particularly preferably greater than or equal to 1.2 and less than or equal to 1.8, again preferably it corresponds to 1.2.

This can ensure that a hydrogen/air mixture that is too rich is not provided for combustion. The hydrogen-powered internal combustion engine is therefore operated in the lean range (lambda>1). Depending upon the performance range, the limit value can be gathered from the value ranges mentioned above. The lambda target limit value is therefore preferably variable across the performance ranges.

As described above, the lambda target range $[\lambda_{target-l}; \lambda_{target-u}]_R$ depends upon the available exhaust gas recirculation quantity. The lambda target range can then be variable.

As described above, the internal combustion engine of the embodiment furthermore comprises an exhaust gas recirculation device which recirculates exhaust gas into the combustion chamber, at least in some ranges. Combustion in the combustion chamber can be stabilized by providing exhaust gas recirculation. For example, knocking of the internal combustion engine due to misfiring can be prevented. In particular in the case of lean combustion, the recirculated exhaust gas contains a significant proportion of unburned oxygen (residual gas) which contributes to stabilizing the combustion.

Not only does the lambda target range $[\lambda_{target-l}; \lambda_{target-u}]_R$ depend on the available exhaust gas recirculation quantity, but the lower limit value $\lambda_{target-l}$ is adjusted in the embodiment in dependence of the exhaust gas recirculation quantity. The exhaust gas recirculation quantity is therefore taken into account when determining the injection fuel quantity, at least in some ranges, in which exhaust gas recirculation is active. In particular, the first lambda target limit value can be reduced as the demanded exhaust gas recirculation quantity increases. It is to be noted that the exhaust gas recirculation quantity not only influences the limit value of the lambda target range, but also acts upon the ambient air quantity L to be supplied, as illustrated by the arrow in FIG. 1. Because, as the exhaust gas recirculation quantity increases, the air quantity to be supplied to the combustion chamber decreases. If the default fuel quantity remains the same, the lambda default value, which must be taken into account in step S44, then decreases. It is to be noted that in FIG. 1, air quantity L for step S2 can be an air quantity last measured (stored), such as from the preceding cycle, while the currently measured air quantity can be used for step S44, which is reduced in view of an actual exhaust gas recirculation quantity. In other words, for determining whether an exhaust gas recirculation quantity must be demanded, a reference value of the air quantity can be used which is preferably derived from a current measurement of the preceding cycle, but can also be determined in advance for a given internal combustion engine. It is to be noted that the demand for an exhaust gas recirculation quantity does not necessarily have to precede the comparison from step S2. Instead, an exhaust gas recirculation quantity can also be demanded at any time or for certain performance ranges.

As shown in FIG. 1, the exhaust gas recirculation quantity $R_{act}$ is demanded, or is increased if the exhaust gas recirculation quantity is already present, when a lambda default value, which indicates the formation of a mixture on the basis of the default fuel quantity and the air quantity, is outside the lambda target range $[\lambda_{target-l}; \lambda_{target-u}]_R$.

By stabilizing combustion by way of the exhaust gas recirculation quantity, the lambda target range can be increased precisely when the lambda default value is outside the lambda target range without exhaust gas recirculation. As the performance demand increases, need for fuel increases, which is why the lambda default value can go outside the permissible range. Therefore, an exhaust gas recirculation quantity can also be demanded above a limit value of the performance demand, i.e. when it is determined that a limit value of a performance demand is exceeded. In the event of transient increases in the load on the internal combustion engine, such as acceleration processes in a motor vehicle, the necessary performance can be provided by demanding an exhaust gas recirculation quantity. Because without the exhaust gas recirculation quantity, the lambda target range would be more limited and the necessary performance could not be provided.

As the default fuel quantity $F_{def}$ increases in the embodiment due to the performance demand, the demanded exhaust gas recirculation quantity is increased. In particular if a lambda target range $[\lambda_{target-l}; \lambda_{target-u}]$ without exhaust gas recirculation, which cannot be achieved with the default fuel quantity $F_{def}$, results from the measured air quantity L, an exhaust gas recirculation quantity is demanded. The exhaust gas recirculation quantity is advantageously adjusted, for example, by way of a valve in the exhaust gas recirculation section so that a lambda target range $[\lambda_{target-l}; \lambda_{target-u}]$ arises which comprises the lambda injection value resulting from the air quantity and the default fuel quantity $F_{def}$. Since the default fuel quantity $F_{def}$ is increased as the performance demand increases, the demanded exhaust gas recirculation quantity is also increased. The demanded exhaust gas recirculation quantity is therefore advantageously increased as the performance demand for the internal combustion engine increases.

Figure 2:
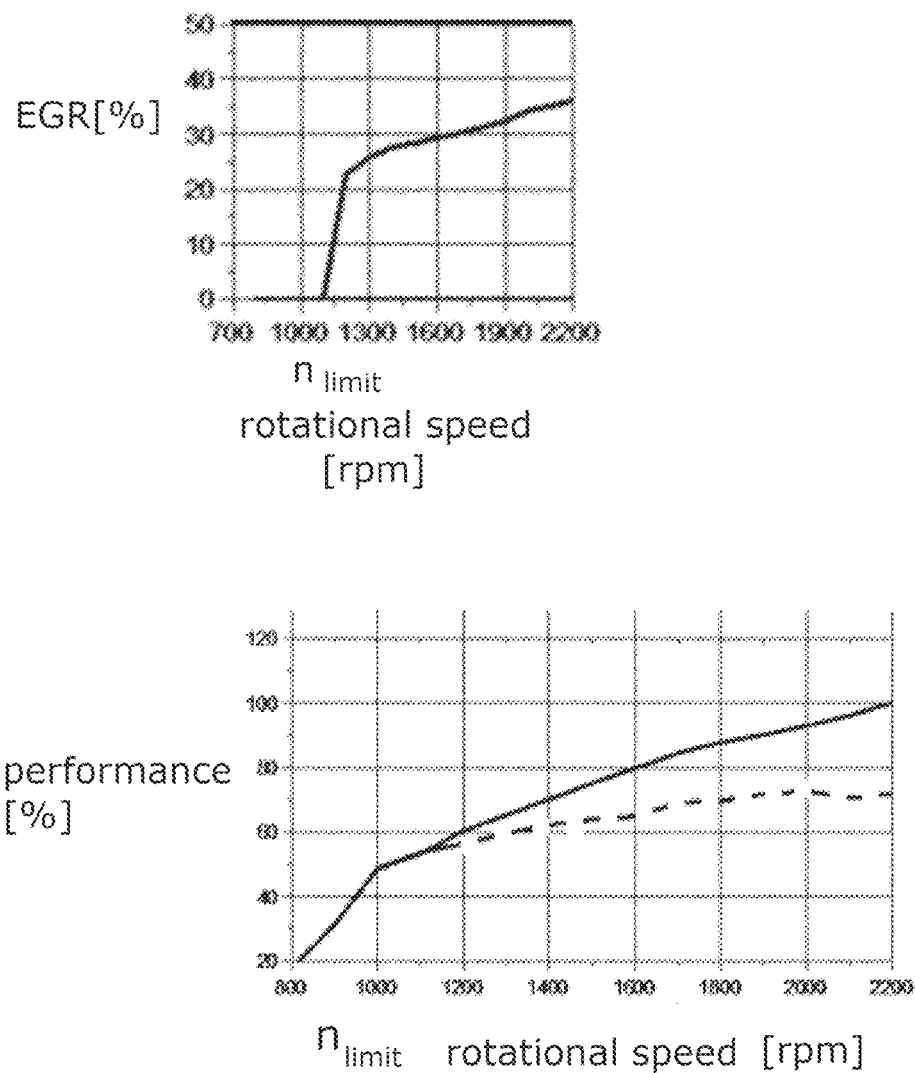
FIG. 2 compares a performance profile over the rotational speed to an exhaust gas recirculation rate over the rotational speed.

This allows for a richer mixture, i.e. a lower lambda injection value, to be set, as is desired with higher performance demands since the exhaust gas recirculation stabilizes combustion, and knocking of the internal combustion engine can then be prevented even at low lambda injection values. The increase in the exhaust gas recirculation quantity can therefore be used to increase performance. This is particularly advantageous for transient processes and at full load. This effect is illustrated in FIG. 2. At the top of FIG. 2, the profile of an exhaust gas recirculation rate EGR is shown across the rotational speed. As can be seen there, the exhaust gas recirculation is provided above a rotational speed limit value $n_{limit}$ and is continuously increased from then on. The profile of the performance, on the other hand, is shown at the bottom of FIG. 2. It is shown there that higher performance can also be provided by increasing the exhaust gas recirculation quantity. The solid line shows the profile of the performance when exhaust gas recirculation is provided. The profile of the dashed line arises without exhaust gas recirculation. Without exhaust gas recirculation, performance can therefore no longer be increased significantly, even if the fuel quantity is increased.

This effect cannot occur in conventional gasoline engines because they are controlled to a fixed lambda value. Therefore, when increasing the exhaust gas recirculation quantity in conventional gasoline engines, the air quantity must be reduced, which also results in a reduced fuel quantity. The calorific value of the combustion mixture correlates with the performance that is output. For this reason, the default fuel quantity $F_{def}$ is determined at least on the basis of a performance demand for the internal combustion engine.

The performance demand can therefore serve as the basis for determining the default fuel quantity and thereby also the injection fuel quantity.

As the performance demand increases, the default fuel quantity is preferably increased, and vice versa. The calorific value of the hydrogen/air mixture correlates with the proportion of fuel in the mixture. This means that higher performance demands can be met by increasing the fuel quantity.

In the above embodiment, a knock signal value can be used, at least in some ranges, to determine the injection fuel quantity.

According to this aspect, a knock signal value, and hence a value indicative of combustion anomalies, can be taken into account when determining the fuel quantity. Information about the tendency of a respective cylinder of the internal combustion engine to knock can there be obtained on the basis of the knock signal value, for example, from a preceding combustion cycle. The tendency to knock depends on factors such as temperatures of the combustion chamber wall, the compression, and manufacturing tolerances. These factors can be used by the knock signal value in determining the injection fuel quantity for the current cycle. The knock signal value can also provide information about the composition of the recirculated exhaust gas. For example, a knock signal value indicating stronger knocking can provide information about a low oxygen content in the exhaust gas, which makes it more difficult to stabilize combustion. The knock signal value can also provide information about the exhaust gas recirculation quantity that is actually available, which can differ from the exhaust gas recirculation quantity that is demanded. Errors in air quantity measurement can also be taken into account and compensated for.

The lambda target range is preferably determined on the basis of the knock signal value and particularly preferably the first lambda target limit value is increased as the knock signal value increases.

This can alleviate knocking in the internal combustion engine. Because, by increasing the lambda target limit value, the mixture can be made leaner, which reduces the tendency to knock.

The knock signal value can also be taken into account as follows. For example, if in step S2 of the above embodiment the lambda target range is adjusted on the basis of the knock signal value, then the fuel quantity is changed in step S41 by the increment ΔF.

However, if a plurality of combustion chambers is provided, the negative value of the increment ΔF due to the execution of step S41 can be added in a step a) to a fuel quantity from at least one other combustion chamber, or the negative value of the increment ΔF can be divided among a plurality of combustion chambers.

This means that both the injection fuel quantity of the at least one combustion chamber as well as the injection fuel quantity of at least one other combustion chamber can therefore be determined on the basis of a (measured) knock signal value associated with at least one combustion chamber. By determining the lambda target range on the basis of the knock signal value and the subsequent correction of the fuel quantity in step S41, the knock signal value of the one combustion chamber can decrease while the fuel quantity is determined at the at least one other of the plurality of combustion chambers such that an overall default fuel quantity, which is a predetermined fuel quantity supplied to all combustion chambers, is approximated as closely as possible, and is again preferably achieved. The one combustion chamber can continue to be operated with a lean mixture compared to a mixture resulting from the default fuel quantity, which can be achieved by an injection fuel quantity that is reduced compared to the default fuel quantity.

In particular, the adjustment of the fuel quantity at the at least one combustion chamber can be compensated for at individual combustion chambers. Preferably, the knock signal value of the at least one combustion chamber is higher than that of the at least one other combustion chamber.

The overall default fuel quantity can be a fuel quantity that is determined on the basis of a performance demand. The default fuel quantity of each individual combustion chamber can be determined from the overall default fuel quantity, for example, by dividing the overall default fuel quantity by the number of combustion chambers if the combustion chambers are identical.

Preferably, in a), as described above, the amount of a change quantity compared to a default fuel quantity of the one combustion chamber is compensated for at least in part, preferably entirely, by the fuel quantity of at least one other combustion chamber.

The previously described redistribution of the fuel quantity can take place in dependence of the respective knock signal values of the other combustion chambers. Combustion chambers with lower associated knock signal values can then proportionally compensate for a larger proportion of the change quantity.

If the overall default fuel quantity or the performance demand can be achieved by the redistribution, then steps S42 to S46 can be omitted.

However, it is possible to combine the redistribution and the exhaust gas recirculation. If, for example, it is determined that the overall default fuel quantity cannot be achieved by compensation at other combustion chambers, then the exhaust gas recirculation quantity can be increased at at least one of the combustion chambers. This corresponds to step b) mentioned above. As already explained before, combustion can be stabilized by b). The increase in the exhaust gas recirculation quantity is effected, at least at the one combustion chamber with which a critical (highest) knock signal value is associated, for example, by a valve or a throttle in the supply channel to the respective combustion chamber. However, it can also be effected globally for each of the plurality of combustion chambers, in which case a valve or a throttle does not need to be provided in each supply channel, but the control can rather take place via a central valve. This simplifies the system and ensures combustion stabilization in all cylinders or combustion chambers, respectively. For this reason, the fuel quantity can therefore be increased in the at least one other combustion chamber. A change quantity at the at least one combustion chamber can therefore be better absorbed at the at least one other combustion chamber.

Alternatively or in addition to increasing the exhaust gas recirculation quantity, the ignition timing in at least one combustion chamber can also be shifted to a later point in time (step c)) and/or the performance demand for the internal combustion engine can be reduced (step d)).

Retarding the position of the ignition prevents uncontrolled combustion too early. In particular, the spark plug can be activated at a later point in time. Shifting the ignition point to a later point in time is related, for example, to a piston position of the piston defining the combustion chamber or to a crank angle and is meant relative to a reference value of the ignition point. The reference value can be, for example, the ignition point from the previous cycle, or another reference value that is associated with the combustion lambda of the one combustion chamber, preferably an optimal ignition point. In particular, the mixture can be ignited at an ignition point at which the piston is disposed closer to the top dead center than to the reference point in time.

Reducing the performance demand means that the overall default fuel quantity can be reduced. This is achieved in particular by reducing the default fuel quantity and thereby the performance demand at the at least one combustion chamber.

It is advantageous to activate the control of the exhaust gas recirculation after the redistribution if, for example, it is determined that the knock signal value is above a permissible limit value despite the redistribution.

Steps b), c) and d) are then executed in this sequence. This means engine-friendly steps such as redistribution and exhaust gas recirculation can be executed first.

It is also possible to perform a verification as to whether redistribution of the fuel quantity is possible. If so, fuel redistribution can be performed, otherwise one of steps b), c) and d) can be executed.

The aspect of redistribution does not necessarily have to be combined with the aspect of determining the injection fuel quantity on the basis of the air quantity, but can also be applied independent thereof. The air quantity therefore does not need to be measured for this purpose.

Regardless of the number of combustion chambers, the fuel quantity can be determined on the basis of a knock signal value and/or the exhaust gas recirculation quantity. In particular, the exhaust gas recirculation quantity can be demanded on the basis of the knock signal value. For example, it is possible to adapt the lambda target range in step S2 of the above embodiment on the basis of the knock signal value. By increasing an exhaust gas recirculation quantity, the lambda target range can in turn be increased. The exhaust gas recirculation quantity is therefore advantageously increased with an increased knock signal value.

Likewise, a lambda sensor can be provided in an exhaust section in the embodiment. A signal value from the lambda sensor can then also be used to determine the injection fuel quantity.

The residual gas content in the exhaust gas can be determined therewith, which can provide information about the mixture ratio from the preceding combustion cycle. In the case of a demanded exhaust gas recirculation, this information can be doubly relevant. Because it also provides information about the residual gas content of the exhaust gas which is fed back into the combustion chamber via the exhaust gas recirculation. The lambda target limit value can therefore also be determined on the basis of the lambda sensor measurement.

Figure 3A:
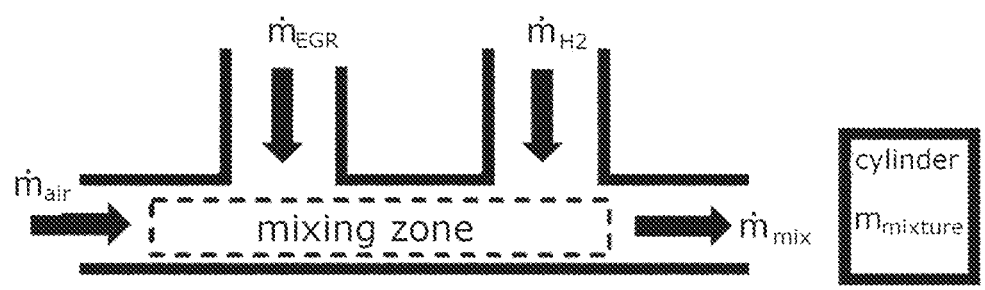
Figure 3B:
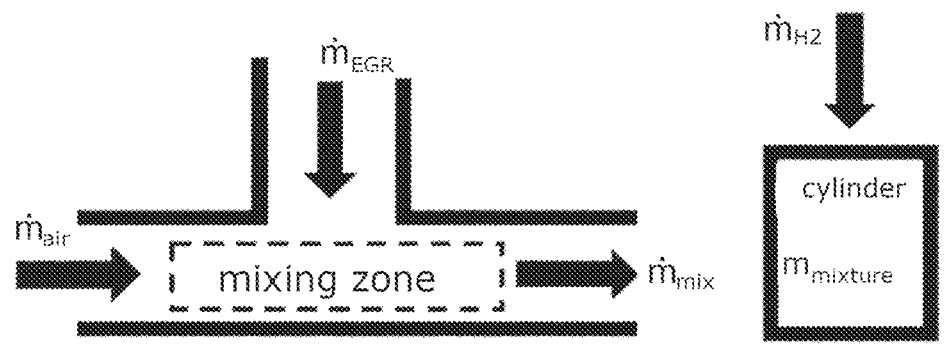
FIG. 3b shows an internal formation of a mixture.

In the above embodiment, the air quantity (air mass) is measured, for example, using an air mass meter. However, the air quantity can also be, for example, modeled using parameters. FIGS. 3a and 3b show the composition of a cylinder filling quantity, i.e. a mixture of fuel, air, and recirculated exhaust gas, in a combustion chamber. With the external formation of a mixture according to FIG. 3a, an air mass flow $\dot{m}_{air}$ and a mass flow of recirculated exhaust gas $\dot{m}_{EGR}$ are supplied downstream. Further downstream, the hydrogen mass flow $\dot{m}_{H2}$ is then fed into a feed channel to the cylinder. In a mixing zone of the supply channel, the mass flows of air from an air inflow channel, of the recirculated exhaust gas from an exhaust gas inflow channel, and of the hydrogen from a fuel inflow channel are mixed. This results in the mixture mass flow $\dot{m}_{mix}$. Integrated over the time over which the mixed mass flow flows into the cylinder, the cylinder filling mass $m_{mixture}$ consisting of fuel, air, and EGR arises. An air mass meter, which measures the mass flow in the respective inflow channel, can be disposed both in the air inflow channel as well as in the exhaust gas inflow channel. Integrated over time, the air mass L and the recirculated quantity of exhaust gas $R_{act}$, which are present in the mixture $m_{mixture}$, arise. However, only one or even none of these values can be measured and at least one air mass sensor can be omitted. If, for example, a maximum cylinder volume and/or cross sections of the inflow channels are known, the respective quantity (mass) of gas can be modeled, for example, by way of pressure sensors in the respective inflow channel.

Unlike FIG. 3a, FIG. 3b shows the case of the internal formation of a mixture, where the fuel is supplied in the cylinder, preferably when the combustion chamber is closed. The mixing zone therefore only mixes the mass flows of air and the recirculated exhaust gas. Here as well, the air quantity and exhaust gas recirculation quantity can be measured or modeled.

The air quantity and/or the exhaust gas recirculation quantity are preferably known actual variables for the combustion cycle to be carried out, which can be determined, for example, on the basis of sensors or modeling. The fuel quantity can be controlled, for example, by way of opening an injection nozzle. In both types of mixtures, the fuel quantity can be adapted using the known variables.

The above method is suitable for use in both types of internal combustion engines.

The above steps do not necessarily all need to be provided, nor do they necessarily need to be executed in this sequence. In ranges in which no exhaust gas recirculation is activated, for example, steps S42 to S46 can be omitted. However, steps S3 to S41 can also be omitted if, for example, the controller directly demands an exhaust gas recirculation quantity for specific performance demands.

Whenever exhaust gas recirculation is referred to in the above description, inert medium supply can also be used instead or in combination.

The present invention is particularly suitable for internal combustion engines with unregulated air quantity. However, for example, a throttle valve can also be provided in the feed channel to the combustion chamber which limits a cross section of the feed channel in the partial load range and completely opens the cross section in the full load range.

Hydrogen is preferably used exclusively as fuel.

The lambda target range can also comprise only one lambda target value The fuel quantity can therefore always be adjusted in relation to a target lambda value, which is variable, for example, in dependence of the exhaust gas recirculation quantity.

In the present disclosure, the term "in some ranges" preferably refers to performance ranges and/or lambda ranges. For example, within a lambda target range, the fuel quantity is determined independently of a lambda target value. For example, the air quantity can be determined only in certain performance ranges. For example, a determination on the basis of the air quantity cannot be made in partial load ranges because the engine runs no risk of knocking.

Unless otherwise specified, the term "at least" is also to include the entirety.

The term "performance" comprises the torque and/or rotational speed of the internal combustion engine.

The term "quantity" comprises in particular mass, but can also comprise, for example, the number of particles or volumes.

"Injection" in this disclosure comprises any type of fuel supply for the formation of the combustion mixture.

The invention claimed is:

1. A method for operating a spark-ignition internal combustion engine,
   wherein said internal combustion engine is operated using hydrogen as fuel,
   wherein said internal combustion engine comprises an exhaust gas recirculation device which recirculates exhaust gas into a combustion chamber, at least in some ranges, and/or an inert medium supply device which is configured to supply an inert medium that does not participate in the combustion into said combustion chamber, and
   wherein a lambda injection value is a value that indicates the formation of a mixture on the basis of an injection fuel quantity ($F_{injection}$) to be supplied to the combustion chamber of said internal combustion engine and an air quantity (L) to be supplied to said combustion chamber from outside of said internal combustion engine,
   the method comprising:
   determining the injection fuel quantity, at least in some performance ranges, independently of a lambda target value at least on the basis of a default fuel quantity ($F_{def}$) and on the basis of an exhaust gas recirculation quantity (R) and/or an inert medium supply quantity, determining the injection fuel quantity, at least in the some performance ranges, on the basis of the air quantity, wherein the injection fuel quantity is determined at least on the basis of a lambda target range ($[\lambda_{target-l}; \lambda_{target-u}]$) of lambda target values, that is limited at least on one side by a first lambda target limit value, and in the lambda target range ($[\lambda_{target-l}; \lambda_{target-u}]$) independently of a lambda target value such that the lambda injection value is within the lambda target range, wherein a lambda default value ($\lambda_{default}$) is determined on the basis of the default fuel quantity ($F_{def}$) and the air quantity (L) and it is determined if the lambda default value ($\lambda_{default}$) is within the lambda target range ($[\lambda_{target-l}; \lambda_{target-u}]$), wherein, if the lambda default value ($\lambda_{default}$) is outside of the lambda target range, the injection fuel quantity is corrected with respect to the default fuel quantity ($F_{def}$) such that the lambda injection value is within the lambda target range, injecting the determined injection fuel quantity into the combustion chamber, wherein the lambda target range ($[\lambda_{target-l}; \lambda_{target-u}]$) is dependent upon the exhaust gas recirculation quantity (R) and/or inert medium supply quantity.

2. The method according to claim 1, wherein the first lambda target limit value is a lower limit value ($\lambda_{target-l}$) of the range of lambda target values.

3. The method according to claim 1, wherein the injection fuel quantity is determined such that the lambda injection value corresponds to the first target lambda limit value ($\lambda_{target-l}$).

4. The method according to claim 1, wherein an exhaust gas recirculation quantity and/or an inert medium supply quantity is demanded or increased, if a lambda default value ($\lambda_{default}$), which indicates the formation of a mixture on the basis of the default fuel quantity and the air quantity, is outside the lambda target range and/or above a limit value of a performance demand.

5. The method according to claim 1, wherein a demanded exhaust gas recirculation quantity and/or inert medium supply quantity is increased as the performance demand for said internal combustion engine increases.

6. The method according to claim 1, wherein the default fuel quantity ($F_{def}$) is determined at least on the basis of a performance demand for said internal combustion engine.

7. The method according to claim 1, wherein the injection fuel quantity is determined, at least in some ranges, on the basis of a knock signal value.

8. A controller configured to carry out the method according to claim 1 and to cause the injection of the determined injection fuel quantity into the combustion chamber.

9. The method according to claim 1, wherein the first lambda target limit value is reduced with increasing demanded exhaust gas recirculation quantity and/or inert medium supply quantity.

10. The method according to claim 2, wherein the first lambda target limit value is greater than or equal to 1.2 and less than or equal to 5.

11. The method according to claim 1, wherein the injection fuel quantity is determined such that the lambda injection value corresponds to the target lambda limit value ($\lambda_{target-l}$), when a lambda default value ($\lambda_{default}$), which indicates the formation of a mixture on the basis of a default fuel quantity and the air quantity (L), is outside the lambda target range ($[\lambda_{target-l}; \lambda_{target-u}]$).

* * * * *